(12) United States Patent
Bullivant et al.

(10) Patent No.: US 8,539,724 B2
(45) Date of Patent: Sep. 24, 2013

(54) RENEWABLE ENERGY SYSTEM

(75) Inventors: Todd J. Bullivant, Rumson, NJ (US); Steven A. Lew, Bayville, NJ (US); Kyle J Tierney, Pt. Pleasant, NJ (US)

(73) Assignee: Milspray, LLC, Lakewood, NJ (US)

( * ) Notice: Subject to any disclaimer, the term of this patent is extended or adjusted under 35 U.S.C. 154(b) by 487 days.

(21) Appl. No.: 12/924,789

(22) Filed: Oct. 5, 2010

(65) Prior Publication Data

US 2012/0080072 A1 Apr. 5, 2012

(51) Int. Cl.
*E04D 13/18* (2006.01)
*E04H 14/00* (2006.01)

(52) U.S. Cl.
USPC .............................. 52/173.3; 52/79.5; 52/143

(58) Field of Classification Search
USPC ....................... 52/173.3, 64, 66, 68, 79.5, 143
See application file for complete search history.

(56) References Cited

U.S. PATENT DOCUMENTS

| | | | | | |
|---|---|---|---|---|---|
| 4,421,943 | A | * | 12/1983 | Withjack | 136/246 |
| 4,948,313 | A | * | 8/1990 | Zankovich | 411/85 |
| 5,969,501 | A | * | 10/1999 | Glidden et al. | 320/101 |
| D584,223 | S | * | 1/2009 | Cooper | D13/102 |
| 8,046,961 | B1 | * | 11/2011 | Cutting et al. | 52/173.3 |
| 2002/0180404 | A1 | * | 12/2002 | Benn et al. | 320/101 |
| 2005/0218657 | A1 | * | 10/2005 | Weesner et al. | 290/55 |
| 2006/0032176 | A1 | * | 2/2006 | Pierson et al. | 52/588.1 |
| 2006/0137348 | A1 | * | 6/2006 | Pas | 60/641.1 |
| 2008/0068782 | A1 | * | 3/2008 | Muchow et al. | 361/601 |
| 2008/0196758 | A1 | * | 8/2008 | McGuire | 136/245 |
| 2009/0079161 | A1 | * | 3/2009 | Muchow et al. | 280/400 |
| 2011/0056146 | A1 | * | 3/2011 | Appert | 52/79.1 |

* cited by examiner

*Primary Examiner* — Brian Glessner
*Assistant Examiner* — Brian D Mattei
(74) *Attorney, Agent, or Firm* — Robert M. Skolnik

(57) ABSTRACT

Electrical power is generated from solar and wind sources thus reducing the need for fuel oil at military forward operating bases and main operating bases. A wind turbine and a solar cell panel are connected to a battery bank. Both the turbine and the solar cells are stored in two standard military shipping containers. When transported to the desired location, these sub-systems are easily set up for operation. The entire apparatus may be disassembled for re-transport and use at another location. Necessary container modifications to connect the system for use are made in such a way as not to alter the container's outside envelope, thus enabling normal transport of the container without damage to the modifications. Each of the solar cells have discs attached so that the solar panel can be assembled in the field by sliding each disc into a mounting channel. This disc and channel structure also allows each cell to be stored in the shipping container by using similar channels mounted back to back in a storage frame located in one of the containers. The solar panel is pivotally mounted in proximity to an edge of the shipping container using mounting elements which interfit with the already provided lift fittings on the container. A wiring harness plugs each solar cell to a conduit for connection to the battery charging system.

10 Claims, 11 Drawing Sheets

RENEWABLE ENERGY SYSTEM

FIELD OF THE INVENTION

The present invention is a military field deployable electrical generating system using renewable energy sources.

SUMMARY OF THE INVENTION AND DESCRIPTION OF RELATED ART

The system of the present invention is specifically designed to meet the needs of military use. It is easy to use and maintain and is portable. The system is contained within rugged existing military containers that afford seamless transition into military embarkation for deployment. The system meets stringent environmental regulations.

The present invention recognizes that the transportation of needed fuel oil in military environments is costly and dangerous. The present invention generates electrical power from solar and wind sources thus reducing the need for fuel oil at forward operating bases and main operating bases.

The invention incorporates one or more wind turbines and a solar panel. Both the turbine and the solar cells used in forming the panel are stored in a housing when transported to the desired location. Then, these sub-systems are easily set up for operation. The entire apparatus may be disassembled for re-transport and use at another location.

The system is housed in two standard military shipping containers. Necessary container modifications to connect the system for use are made in such a way as not to alter the container's outside envelope, thus enabling normal transport of the container without damage to the modifications.

The present invention recognizes the particular requirements of a military environment. The system is housed in existing standard military shipping containers. Each of the solar cells have discs attached so that the solar panel can be assembled in the field by sliding each disc into a mounting channel. This disc and channel structure also allows each solar cell to be stored in the shipping container by using similar channels mounted back to back in a storage frame located in one of the containers. This internal storage provides convenience and protection.

The solar array is pivotally mounted in proximity to an edge of the shipping container using mounting elements which interfit with the already provided lift fittings on the container.

Electrical connection (and disconnection) of the solar cells to each other and to the storage battery banks is easily accomplished with an electrical harness.

PRIOR ART

There are several mobile or transportable solar generating systems commercially available as follows:
Sky Built Power's Sky Station:
http://www.skybuilt.com/products/products_skystation.htm
Sun Seeker Mobile Trailer:
http://www.solartrailer.com/
CT Solar:
http://www.ctsolar.com/
1kw800ahtrailersolarpowersystem.aspx
Mobile Solar Power:
http://www.mobilesolarpower.net/
SolaRover:
http://allthingsrenewable.com/store/product/4344/SolaRover-Mojave-2-Mobile-Solar-Power-System/
NEST:
www.nestenergysystems.com The SkyBuilt Power product is a containerized system having an angularly mounted solar panel, a wind turbine, and a backup generator. The container size can be 10-40 feet. The Sun Seeker is a trailer mounted solar panel. The system has a capability to relocate the panel for more sun hours by moving the trailer. CT Solar is another trailer mounted panel. This trailer has 1000 W of cells that fold onto the top and one side of the panel. The panels are deployed when stopped using an electrical jack-screw/hydraulic piston system. Mobile Solar Power uses a two section solar panel. One section travels on the top of the trailer, the other section on the side of the trailer. SolaRover is a trailer mounted solar panel. Nest Energy Raven's trailer ships with its solar panels on the outside, already in place—just folded against the container.

DETAILED DESCRIPTION OF THE PREFERRED EMBODIMENT

Figure 1:
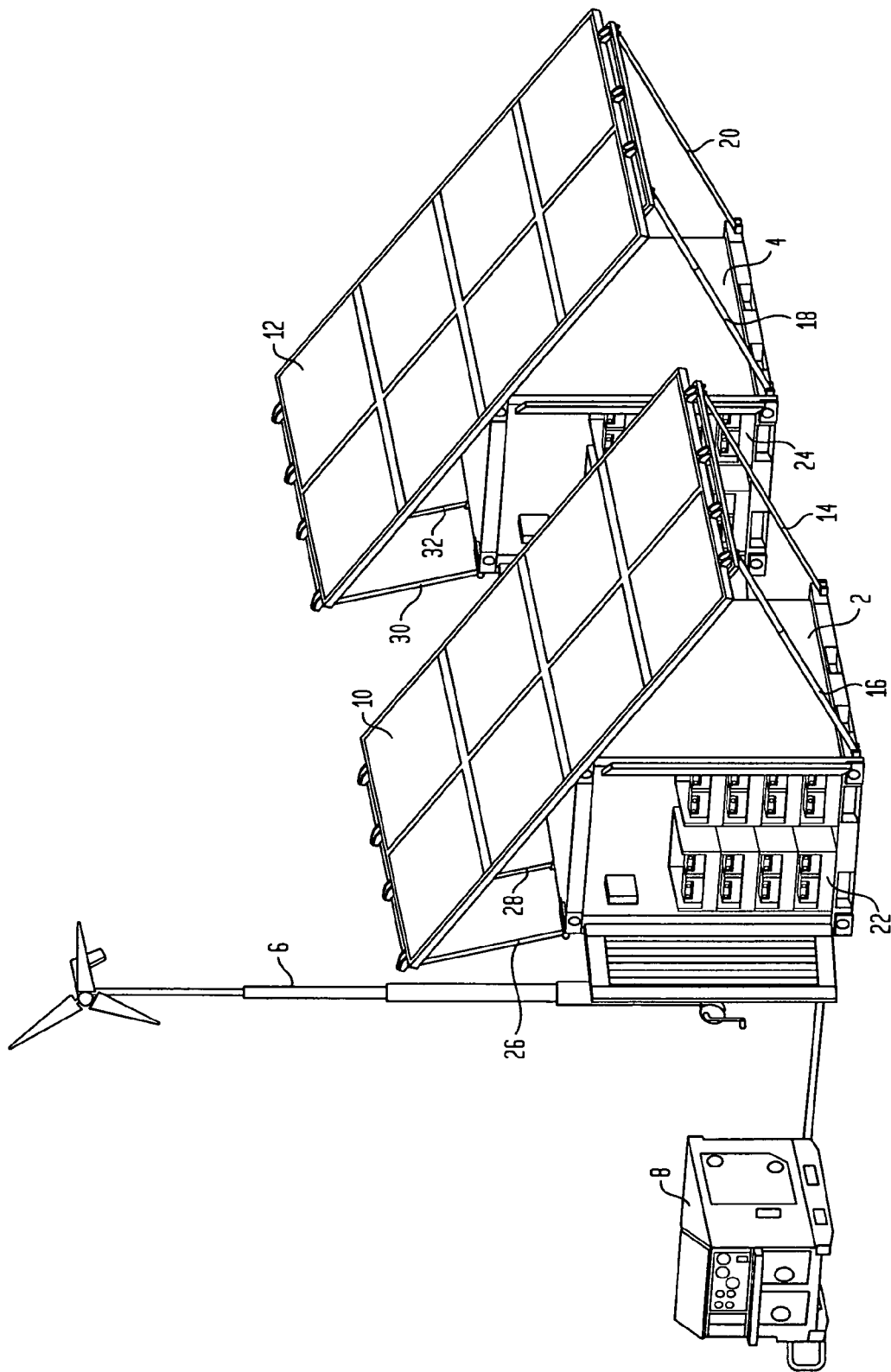
FIG. 1 is a front perspective view of the power generating system.

As shown in FIG. 1, two standard military transportation containers 2 and 4 (each known as an ACA QUADCON) have solar panels, 10 and 12 pivotally mounted thereon. The containers 2 and 4 house battery banks 22 and 24 respectively. The system also includes a back-up diesel generator 8 and one or more wind turbines 6.

Each solar panel, 10 and 12 are adjustably supported on their respective pivot mounting by pairs of lower adjustable support 14 and 16, for panel 10, and 18 and 20 for panel 12. Four upper supports for each panel (two of which are shown in FIG. 1) are also provided, 26 and 28 for panel 10 and 30 and 32 for panel 12.

Figure 2:
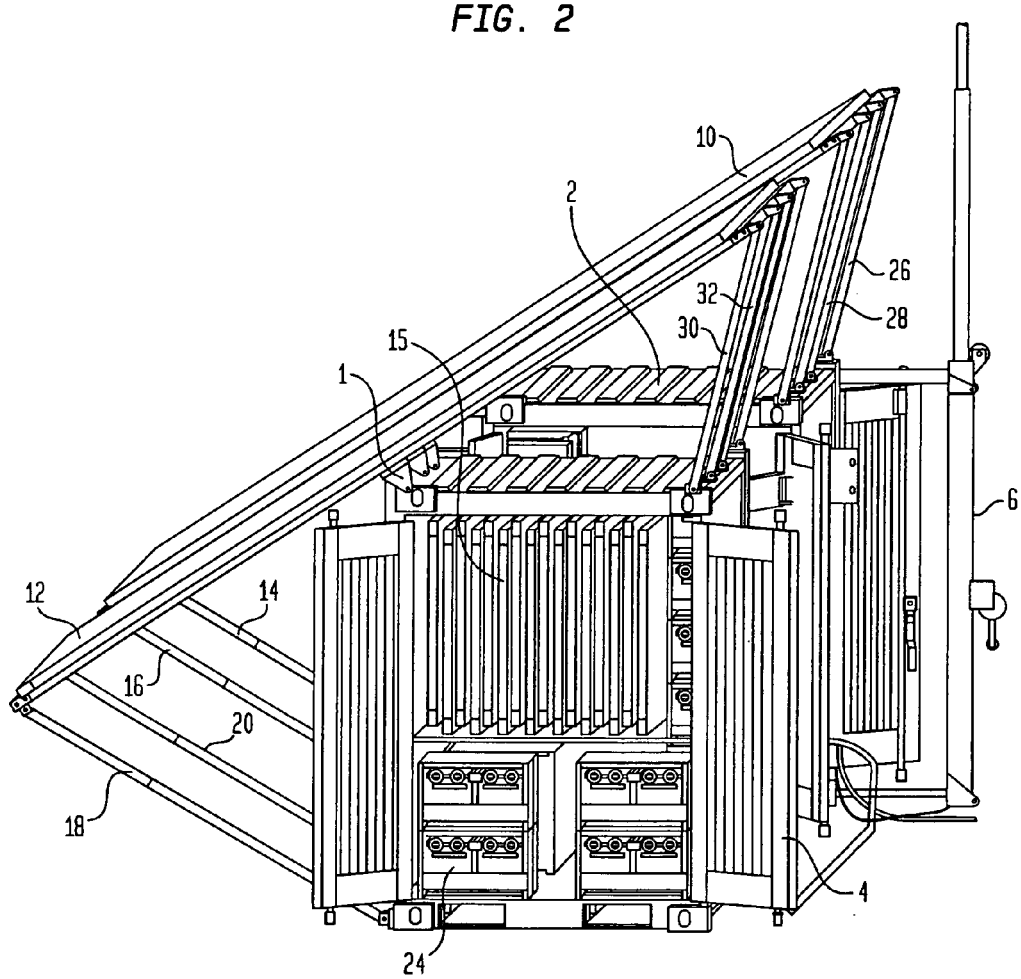
FIG. 2 is a rear perspective view of the power generating system.

FIG. 2 is a rear perspective view of the power generating system. As shown therein, ACA QUADCON container 4 contains a battery bank 24 and a solar cell storage rack which is discussed in further detail below. As will now be seen in FIG. 2, each solar panel, 10 and 12, is pivotally mounted near the edges of containers 2 and 4 using a plurality of pivoting mounts 1. Four longitudinally extendable pivotable upper supports for each solar panel are also provided. Numerals 26 and 28 denote two of the supports for panel 10. Numerals 30 and 32 denote two of the supports for panel 12.

Two pivotably mounted longitudinally adjustable lower supports are provided for each panel. Lower supports 14 and 16 are supporting panel 10 and supports 18 and 20 are provided for panel 12. As will now be seen, lengthwise adjustments of the supports will change the angle of the panels to provide optimum surface area for solar exposure.

Figure 3:
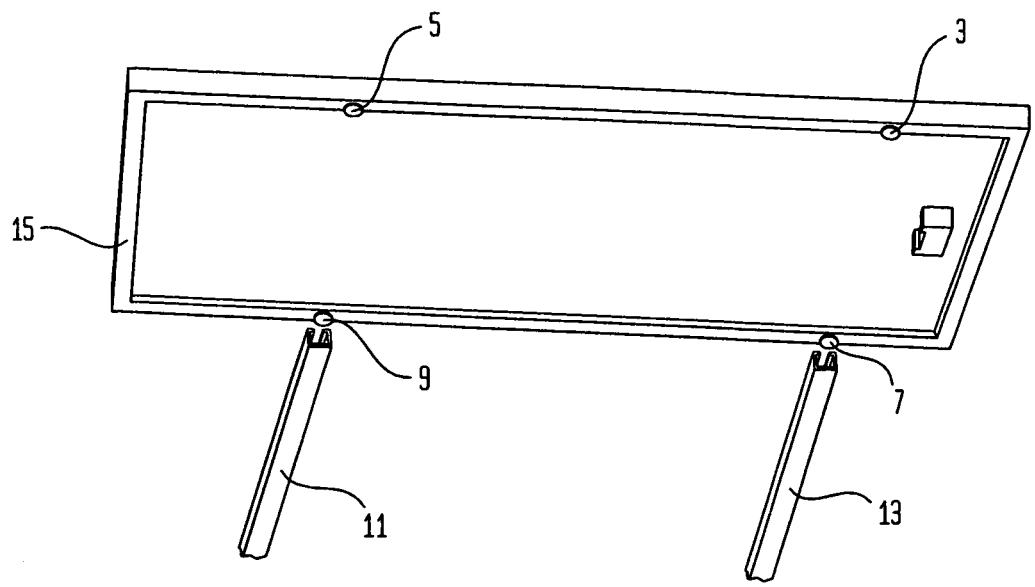
FIG. 3 is a perspective view of the solar panel slidable mounting.
Figure 4:
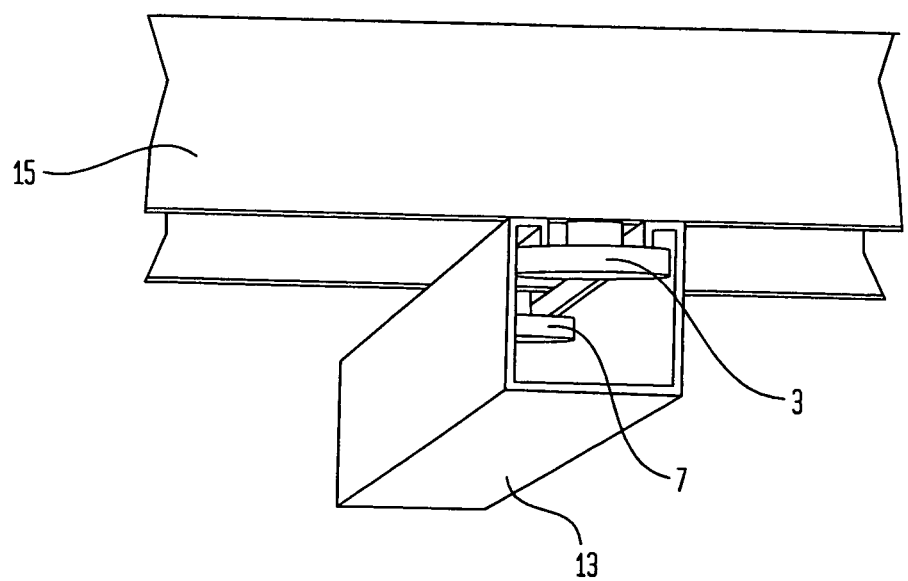
FIG. 4 is a detailed perspective view of the slidable mounting.

Ease of field assembly and disassembly is essential in military environments. Accordingly, the solar panels may be easily assembled, disassembled and stored when the system is to be relocated. As shown in FIGS. 3 and 4, four circular discs 3, 5, 7, and 9 are attached at the bottoms of each solar cell (one of which 15 is shown in FIG. 3). The discs may or may not be rotatably attached to the solar cell. The discs hold the solar cell in place when the cell 15 is slid into supporting channels 11 and 13. The use of the disc and channel mounting achieves ease of panel assembly and disassembly in the field and ease of cell storage.

Returning to FIG. 2, all of the solar cells, of which numeral 15 denotes one of the stored cells, are mounted in back-to-back fashion in a frame formed of upper and lower channels similar to channels 11 and 13 of FIGS. 3-4. As with assembly of the solar panel, each cell is thus securely stored by sliding its discs into respective upper and lower storage channels within ACA QUADCON 4.

To further enhance ease of assembly and disassembly, the channels such as 11 and 13 may be formed in convenient lengths, and connected to other channel sections with hinges so that the lengths of channels, necessary to support solar cells in panels 10 and 12 can be formed by simply unfolding the channel segments at the hinges.

Figure 5:
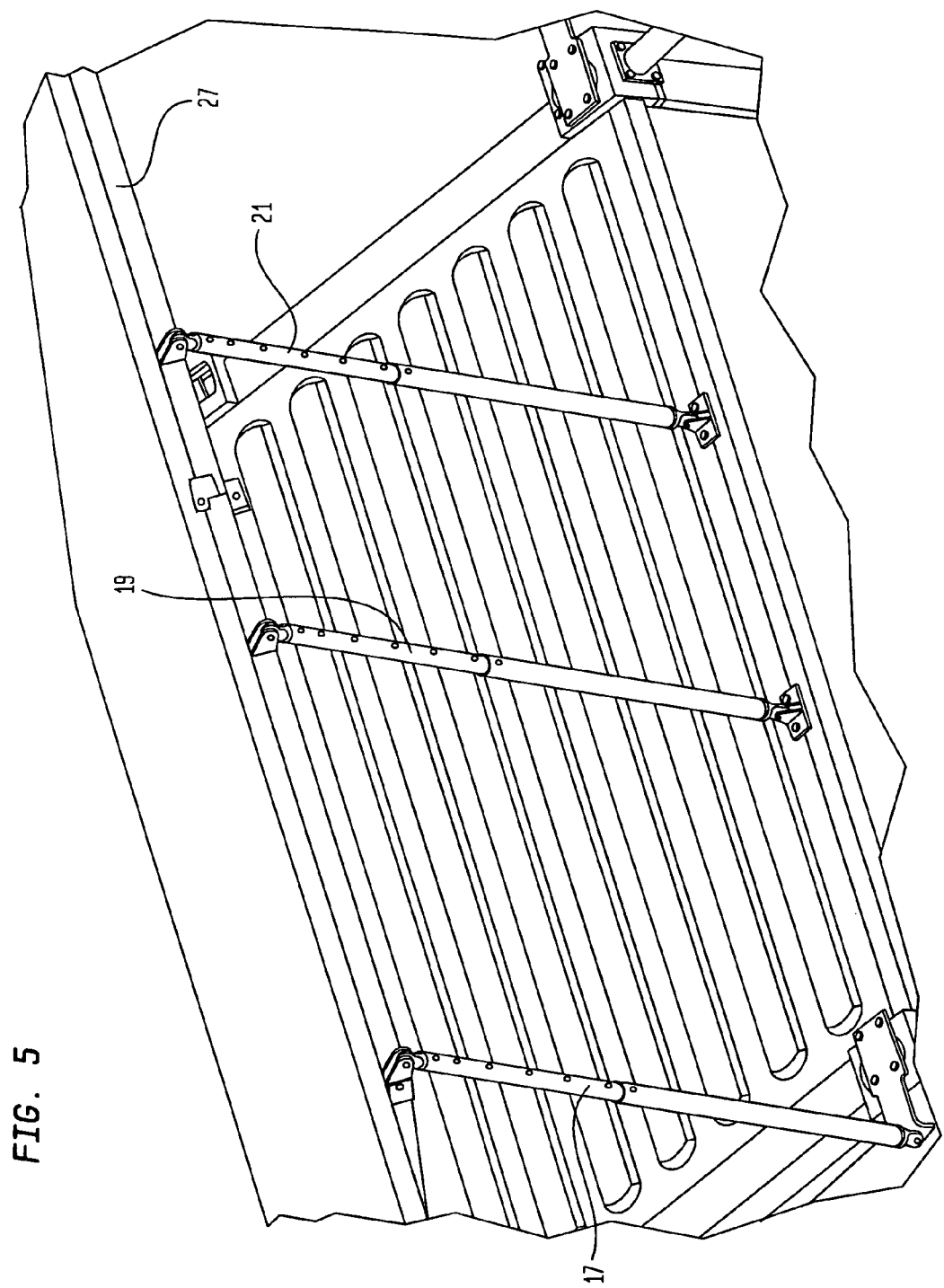
FIG. 5 is a perspective view of the upper solar panel array end mounting.
Figure 6:
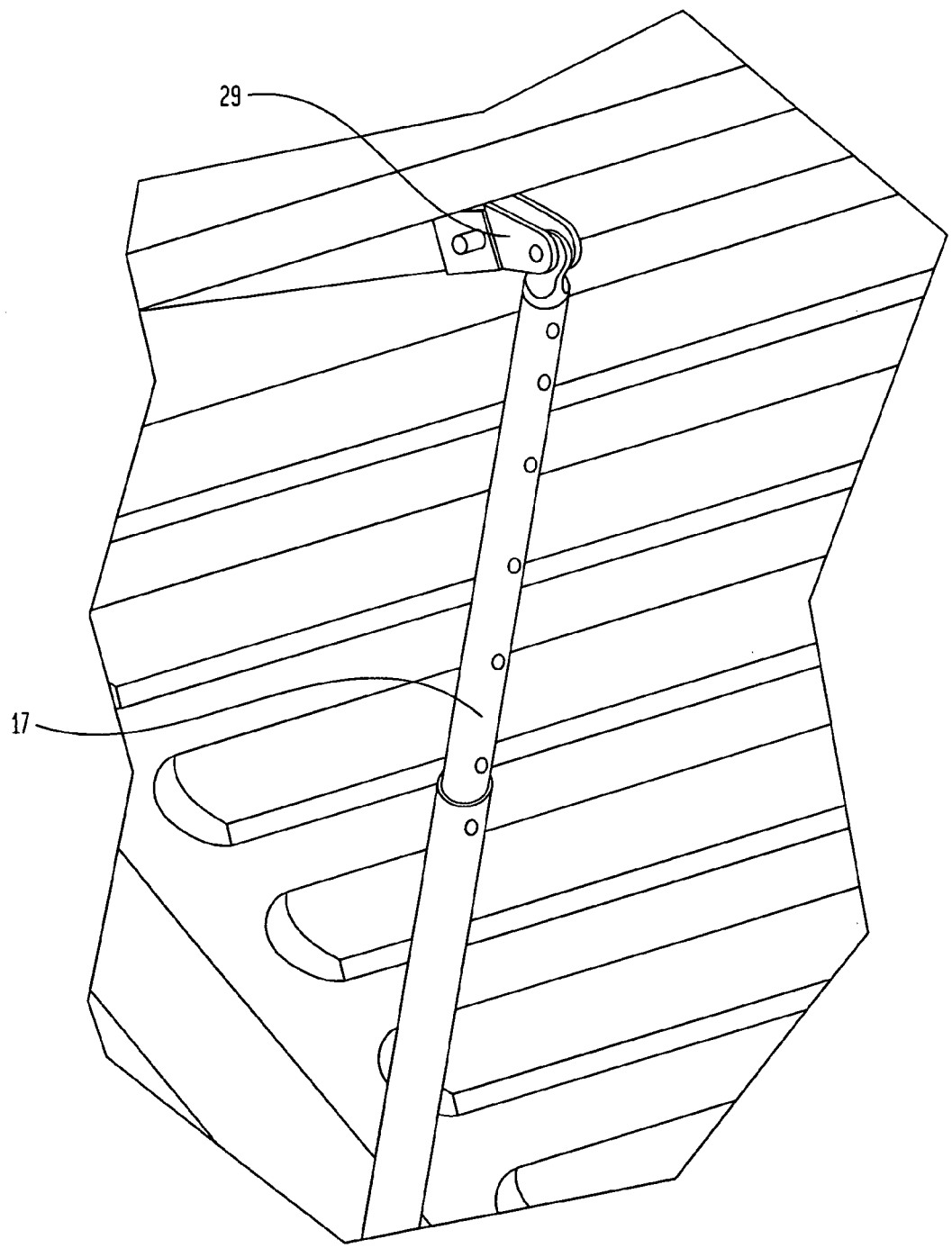
FIG. 6 is a detailed perspective view of a portion of FIG. 5.

FIGS. 5-6 are perspective views of the upper end solar panel supporting structure. In FIG. 5, three longitudinally adjustable upper supports 17, 19, and 21 are pivotally connected to the upper end solar panel supporting bar 27. The fourth support is not shown. Each of the solar cell supporting channels are connected to end caps (one of which, 29 is identified in FIG. 6). Each of the upper end caps 29 is formed integrally with the upper pivot points for supports 17, 19, 21, and 23.

Figure 7:
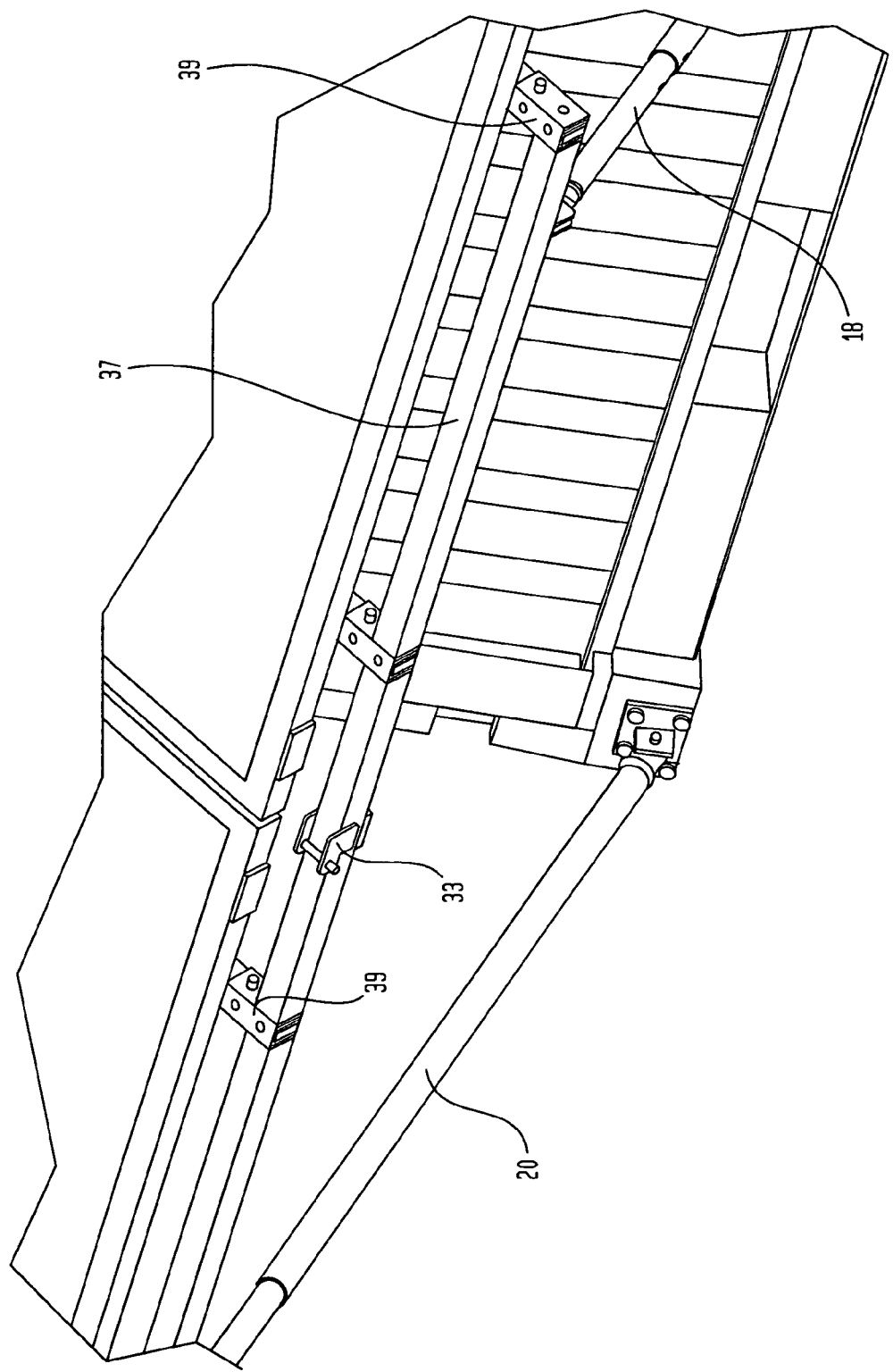
FIG. 7 is perspective view of the lower solar panel array end mounting.
Figure 8:
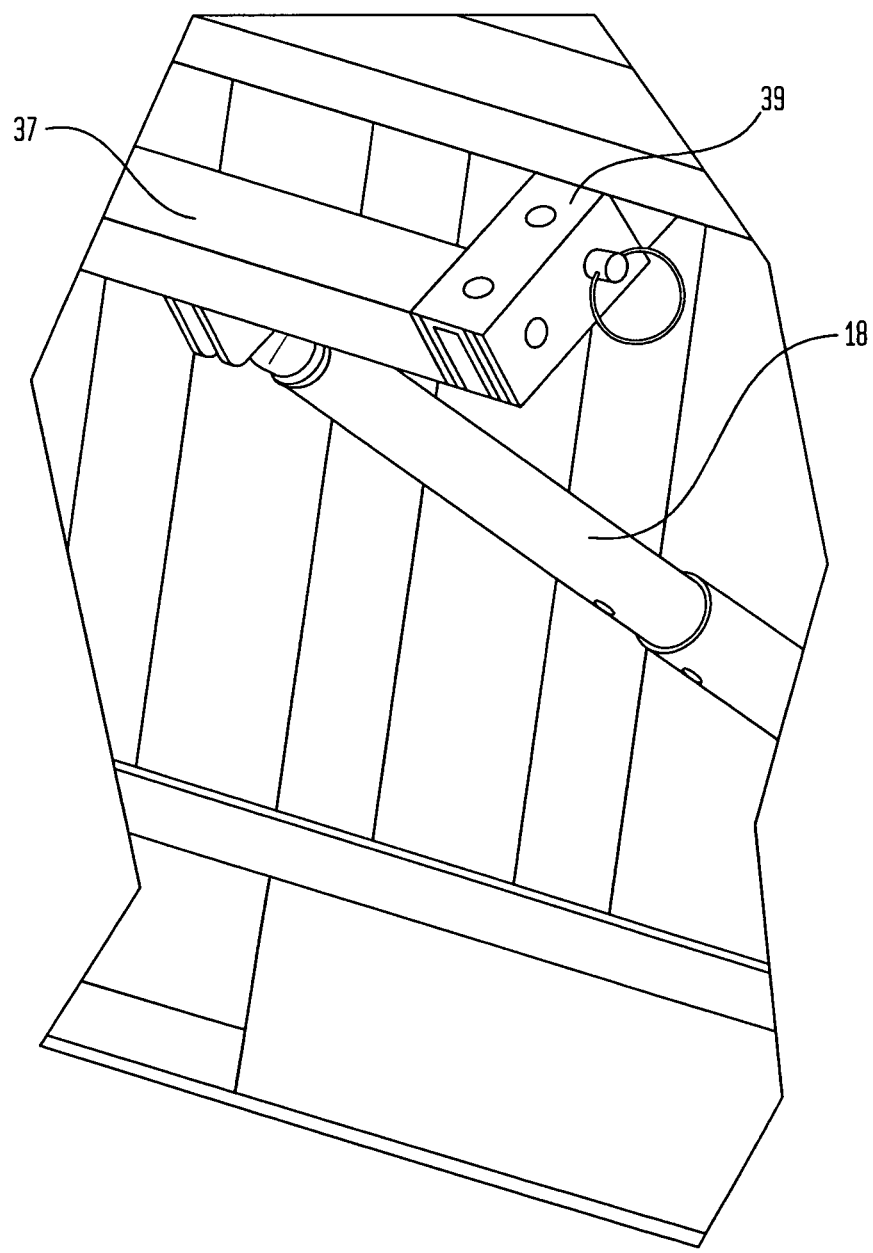
FIG. 8 is a detailed perspective view of a portion of FIG. 6.

FIGS. 7-8 are perspective views the lower end solar panel supporting structure. A pair of lower longitudinally adjustable supporting rods 18 and 20 are pivotally connected near a bottom edge of the ACA QUADCON container, and to bar 37. Unlike the upper end support, the pivot points on bar 37 are not formed integrally with end caps 39. Both the upper and lower supporting bars are hinged as at 33 so that they can be stored in convenient lengths and unfolded to the required lengths.

Figure 9:
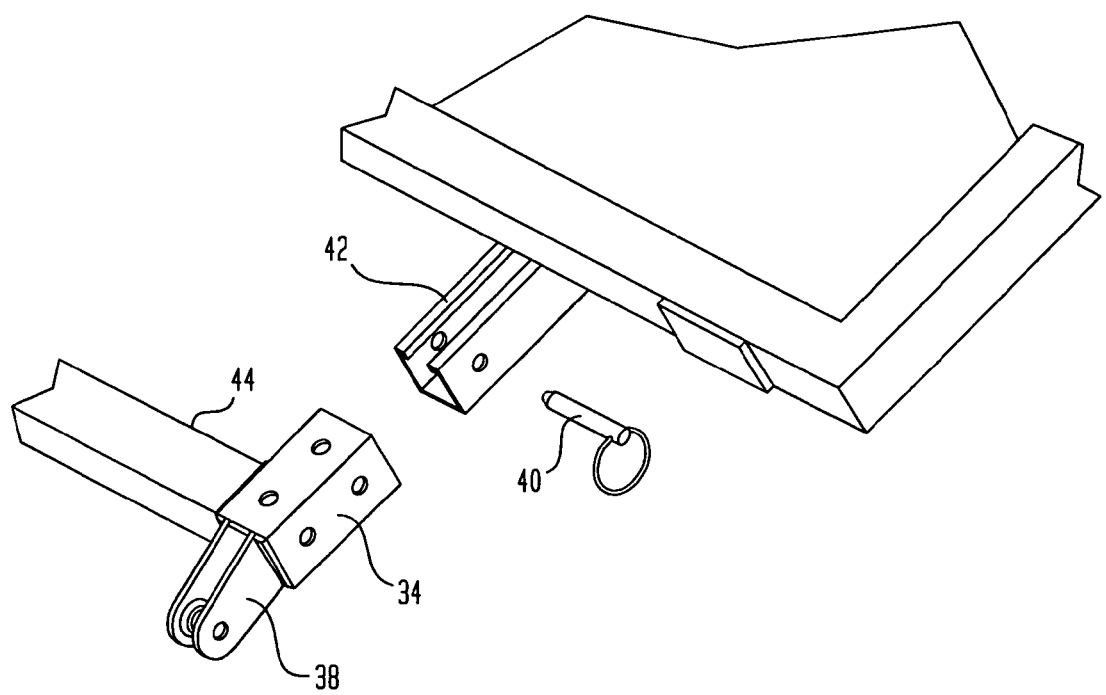
FIG. 9. is an exploded view of the end cap fitting onto the array mounting.

FIG. 9 is a detailed exploded view of an end cap 34. As will now be seen, end cap 34 is fit over the end of disc supporting channel 42 and pinned in place by locking pin 40. This now serves to prevent the discs (and therefore the solar cells) from sliding out of the open ends of the channel 42.

A pivot point 38 is formed integrally with the end cap 34. Each upper and lower end cap closure, such as 34, may be either removeably or permanently attached to the upper and lower supporting bars.

Figure 10:
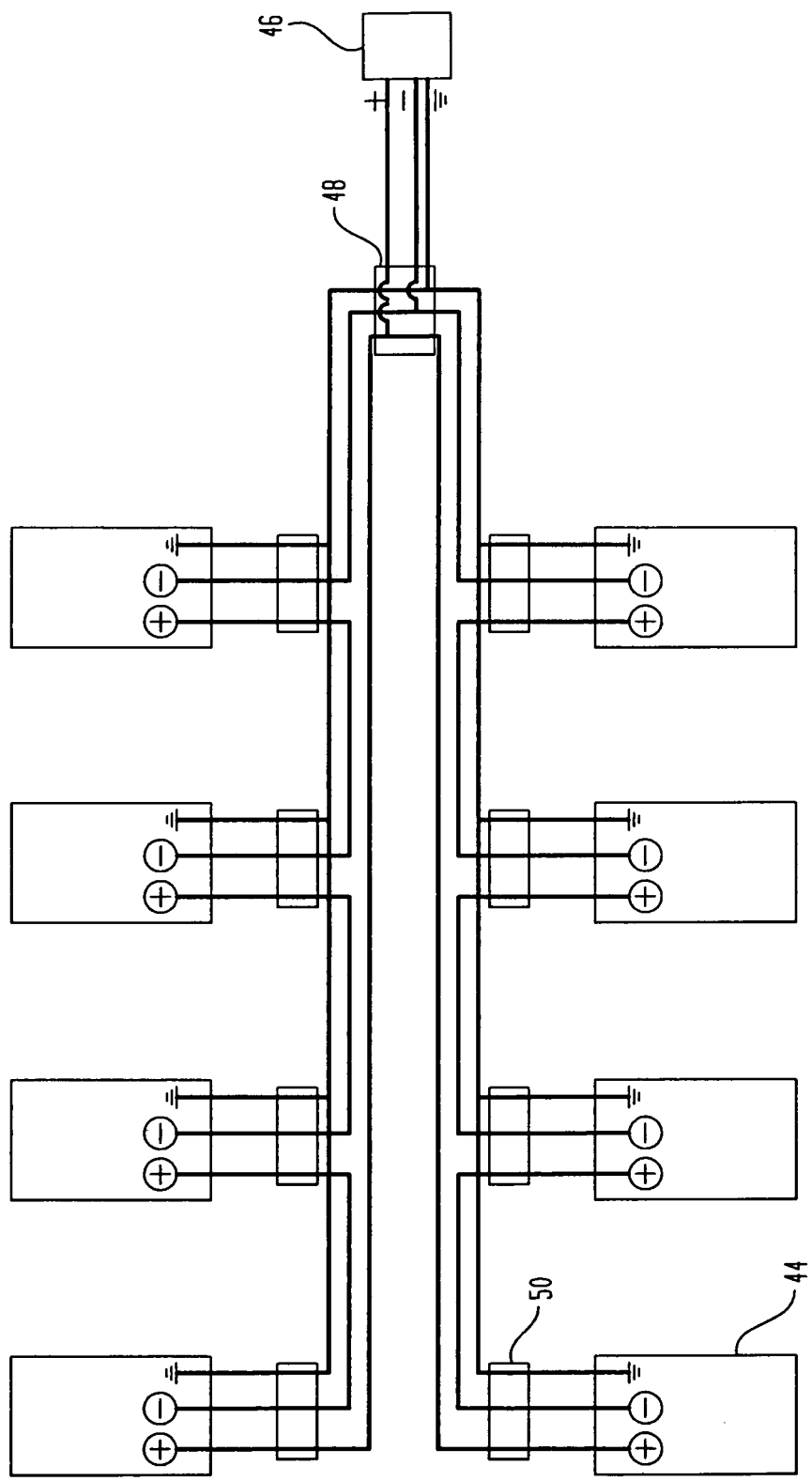
FIG. 10 is an electrical wiring diagram of the wiring harness.
Figure 11:
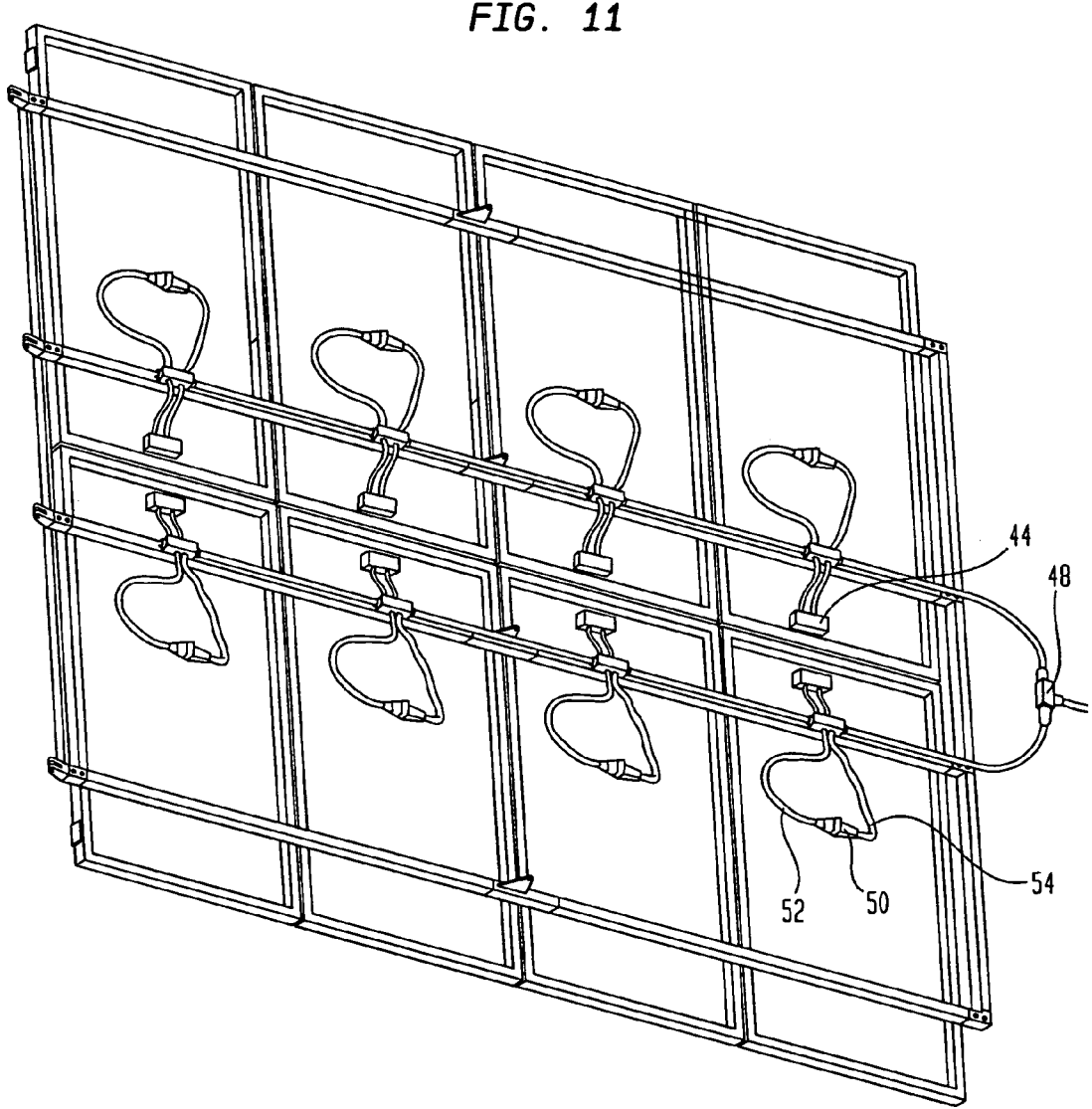
FIG. 11 is a perspective view of the underside of the solar array showing connection of the panels with the wiring harness.
Figure 12:
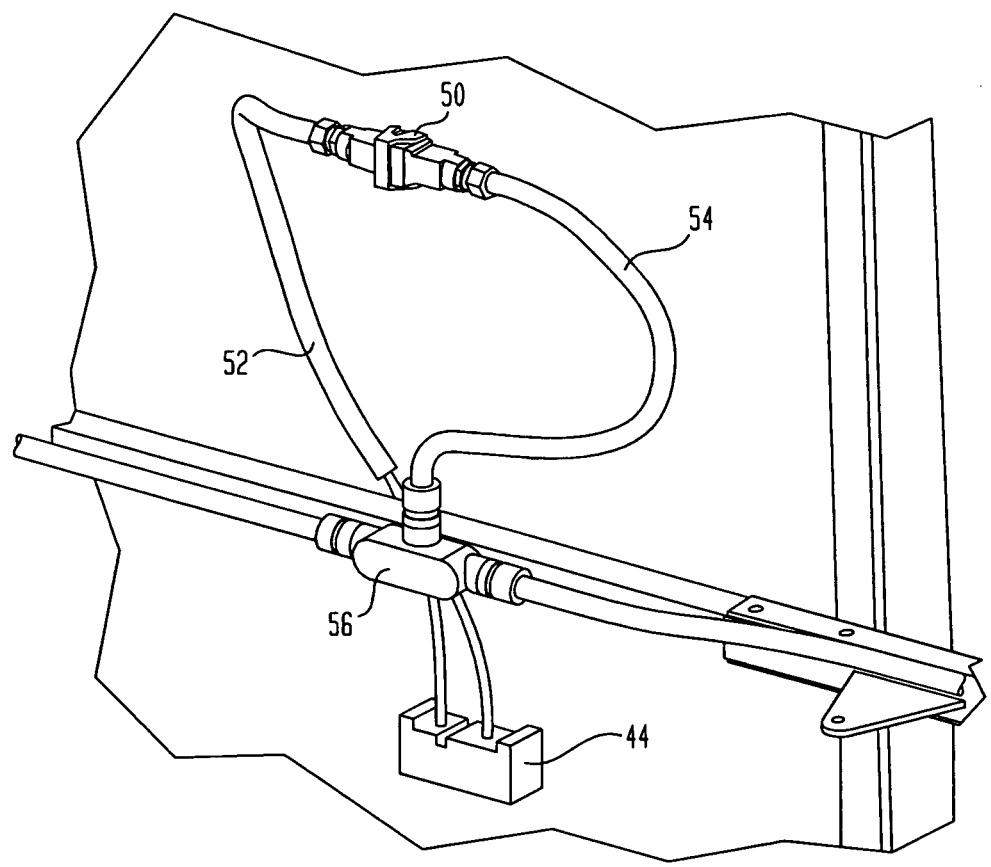
FIG. 12 is a perspective view of a connection of a solar panel to the wiring harness.

The wiring harness to enable quick electrical connect and disconnect of the solar panels in a panel array is shown in FIGS. 10-12. Each solar cell has an electrical connection box 44 affixed to the underside of the solar cell. The electrical wires from each box 44 is connected to one side of plug 50 via a cable 52. The other side of plug 50 is connected to a T-shaped conduit connector 56.

The solar cells are wired as shown in FIG. 10 connected to a junction box 48 then to the battery charging system via connector 46. The charging system is an inverter/charger system which controls the operation of the system. The inverter/charger takes the input energy from the array and wind turbine and directs it to charge the batteries. It then converts the battery DC energy into AC power (inverting) when a load is attached.

The system also includes a diesel generator 8 that performs two functions: it automatically starts to charge the batteries when there isn't sufficient solar or wind power to keep them fully charged. The generator AC is converted to DC by the inverter/charger and directed to charge the batteries; and as a fail-safe in the event of inverter/charger failure where it cannot provide output AC, the generator can bypass that system and power the load directly. The generator will incorporate a fuel tank allowing it to run for 8 hours without refueling. It can also be fueled from Jerry cans or 55 gallon drums by small pumps or siphons.

A major feature of the system is the reduction of thermal load and therefore it's derating effect on battery effectiveness. Most deep cycle batteries for renewable energy power storage are nominally rated to operate at 75° F. and derate (reduced power output and number of discharge/recharge cycles) as temperature rises. As military use in high temperature environments is anticipated, the system includes:

a. Special high temperature tolerant batteries that have been tested to operate effectively at 122° F. for extended periods;

b. High velocity ventilation fans to maintain internal container temperature as close to ambient as possible;

c. A solar reflective coating on the outside of the ACA QUADCON containers to minimize heat transfer to the inside of the container.

Further modifications to the methods and apparatus of the invention may be made without departing from the spirit and scope of the invention.

We claim:

1. A field deployable renewable electrical energy generating system comprising a container; a solar panel pivotally mounted on said container, said solar panel being formed of a plurality of solar cells mounted in a support frame for rapid assembly and disassembly; said support frame including a plurality of elongated hollow channels and upper and lower end supports attached to said channels; sliding means including a plurality of circular discs attached to each solar cell for slidably mounting each of said solar cells in said channels; said upper and lower end supports having end cap means mounted thereon for closing the ends of said channels to prevent said solar cells from sliding out of said channels; and solar cell storage means mounted in said container for storing each of said solar cells when said array is disassembled, said solar cell storage means including two channeled supports mounted in a frame for receiving said circular discs therein.

2. The field deployable renewable electrical energy generating system of claim 1 further including a wind turbine and a plurality of storage batteries connected to said solar cell array and to said wind turbine.

3. A field deployable renewable electrical energy generating system comprising a container; a solar panel pivotally mounted on said container, said solar panel being formed of a plurality of solar cells mounted in a support frame for rapid assembly and disassembly; said support frame including a plurality of elongated hollow channels and upper and lower end supports attached to said channels; sliding means including a plurality of circular discs attached to each solar cell for slidably mounting each of said cells in said channels; said upper and lower end supports having end cap means mounted thereon for closing the ends of said channels to prevent said solar cells from sliding out of said channels; at least one longitudinally adjustable solar panel support pivotally connected between each of said upper and lower end supports and said container for adjusting the angle of said solar panel; and solar cell storage means mounted in said container for storing each of said solar cells when said array is disassembled said solar cell storage means including two channeled supports mounted in a frame for receiving said circular discs therein.

4. The field deployable renewable electrical energy generating system of claim 3 wherein said system includes a wind turbine electrical generator and plurality of electrical storage batteries connected to said wind turbine and to said solar panel.

5. The field deployable renewable electrical energy generating system of claim 4 further including electrical connection means for serially connecting each solar cell in said array to an electrical control system.

6. The field deployable renewable electrical energy generating system of claim 5 wherein said electrical connection means includes a harness having plug connections to each solar cell in said array.

7. The field deployable renewable electrical energy generating system of claim 4 wherein said batteries operate at high temperatures.

8. The field deployable renewable electrical energy generating system of claim 7 further including cooling fan means mounted in said container.

9. The field deployable renewable electrical energy generating system of claim 8 wherein said container is treated with a heat reflective coating.

10. The field deployable renewable electrical energy generating system of claim 3 wherein each of said channels and said upper and lower end supports are formed in hinged sections.

* * * * *